US011811641B1

(12) United States Patent
Hegde et al.

(10) Patent No.: US 11,811,641 B1
(45) Date of Patent: Nov. 7, 2023

(54) SECURE NETWORK TOPOLOGY

(71) Applicant: Juniper Networks, Inc., Sunnyvale, CA (US)

(72) Inventors: Shraddha Hegde, Bangalore (IN); Antoni B Przygienda, Sunnyvale, CA (US); Salih K A, Bangalore (IN); Harsha Lakshmikanth, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 609 days.

(21) Appl. No.: 16/826,002

(22) Filed: Mar. 20, 2020

(51) Int. Cl.
*G06F 15/173* (2006.01)
*H04L 45/02* (2022.01)
*H04L 41/12* (2022.01)
*H04L 45/00* (2022.01)
*H04L 45/28* (2022.01)
*H04L 9/40* (2022.01)

(52) U.S. Cl.
CPC ............ *H04L 45/02* (2013.01); *H04L 41/12* (2013.01); *H04L 45/04* (2013.01); *H04L 45/22* (2013.01); *H04L 45/28* (2013.01); *H04L 45/32* (2013.01); *H04L 63/1408* (2013.01)

(58) Field of Classification Search
CPC ..... H04L 41/12; H04L 63/1408; H04L 45/02; H04L 45/32; G06F 16/951
USPC .................................................. 709/217, 224
See application file for complete search history.

(56) References Cited

U.S. PATENT DOCUMENTS

| | | | | |
|---|---|---|---|---|
| 10,785,809 | B1 * | 9/2020 | Thubert | H04W 76/10 |
| 2003/0069960 | A1 * | 4/2003 | Symons | H04L 41/0866 |
| | | | | 709/224 |
| 2004/0157556 | A1 * | 8/2004 | Barnett | H04W 36/00835 |
| | | | | 455/41.2 |
| 2008/0317002 | A1 * | 12/2008 | Boppana | H04W 40/00 |
| | | | | 370/352 |
| 2009/0222921 | A1 * | 9/2009 | Mukhopadhyay | G06N 5/04 |
| | | | | 726/23 |
| 2013/0051248 | A1 * | 2/2013 | Pei | H04L 43/0823 |
| | | | | 370/245 |

(Continued)

OTHER PUBLICATIONS

Bjorklund, "Yang—A Data Modeling Language for the Network Configuration Protocol (Netconf)," Internet Engineering Task Force (IETF), RFC 6020, Oct. 2010, 174 pp.

(Continued)

*Primary Examiner* — Lan Dai T Truong
(74) *Attorney, Agent, or Firm* — Shumaker & Sieffert, P.A.

(57) ABSTRACT

A secure IGP topology or other link state topology can be implemented by a network security unit that runs in a centralized environment on servers separate from a network associated with the IGP topology. The network security unit acquires the topology information, such as by participating in IGP or through border gateway protocol with link state (BGP-LS). The network security unit detects possible network problems, such as indicators of potential network attacks. Once an indicator of a potential network attack is detected, the network security unit identifies the node that is compromised. Once the compromised node is identified, the network security unit can report the node for manual or automated intervention. In some aspects, the network security unit can isolate the compromised node by shutting down links connected to the compromised node.

20 Claims, 4 Drawing Sheets

(56) References Cited

U.S. PATENT DOCUMENTS

| | | | | |
|---|---|---|---|---|
| 2013/0305357 | A1* | 11/2013 | Ayyagari | H04B 7/18593 726/22 |
| 2015/0047026 | A1* | 2/2015 | Neil | H04L 63/1433 726/22 |
| 2015/0188935 | A1* | 7/2015 | Vasseur | H04W 12/12 726/23 |
| 2015/0350227 | A1* | 12/2015 | Kruglick | H04L 63/1416 726/23 |
| 2016/0028753 | A1* | 1/2016 | Di Pietro | H04L 63/1425 726/23 |
| 2016/0110544 | A1* | 4/2016 | Singla | H04L 67/1002 726/23 |
| 2016/0218951 | A1* | 7/2016 | Vasseur | H04L 43/022 |
| 2016/0261482 | A1* | 9/2016 | Mixer | H04L 43/12 |
| 2016/0328658 | A1* | 11/2016 | Goyal | G06Q 30/0201 |
| 2016/0359887 | A1* | 12/2016 | Yadav | H04L 61/1511 |
| 2017/0237767 | A1* | 8/2017 | George | H04L 63/1458 726/23 |
| 2018/0046715 | A1* | 2/2018 | Wang | H04L 41/12 |
| 2020/0067983 | A1* | 2/2020 | Soryal | G06F 9/45558 |
| 2021/0006484 | A1* | 1/2021 | Fan | G06F 11/0757 |
| 2021/0217019 | A1* | 7/2021 | Huang | G06Q 20/407 |
| 2021/0360032 | A1* | 11/2021 | Crabtree | G06F 16/2477 |

OTHER PUBLICATIONS

"Contrail Healthbot," Juniper Networks, Inc., May 2019, 3 pp.

Kruegel et al., "Topology-based detection of anomalous BGP," Reliable Software Group, University of California, accessed Feb. 3, 2020, 20 pp.

Alam et al., "RTT-TC: A Topological Comparison Based Method to Detect Wormhole Attacks in MANET," ECE Department, Curtin University of Technology, IEEE, date of conference: Nov. 11-14, 2010, 4 pp.

Jero et al., "BEADS: Automated Attack Discovery in OpenFlow-Based SDN Systems," Purdue University, RAID 2017, LNCS 10453, pp. 311-333, 2017, 23 pp.

Weimer et al., "Distributed Detection and Isolation of Topology Attacks in Power Networks," HiCoNS '12: Proceedings of the 1st international conference on High Confidence Networked Systems, Apr. 2012, pp. 65-72, https://doi.org/10.1145/2185505.2185516, 7 pp.

Urbina et al., "Survey and New Directions for Physics-Based Attack Detection in Control Systems," NIST GCR 16-010, available at: https://doi.org/10.6028/NIST.GCR.16-010, Nov. 2016, 40 pp.

Muthukumar et al., "FSSAM: Detecting Wormhole Occurrence Using Five-Stage Security Analysis Model in MANET," Applied Mathematics & Information Sciences, An International Journal, Appl. Math. Inf. Sci. 13, No. 5, 813-819 (2019), Accepted Apr. 19, 2019, 7 pp.

Awad et al., "BT-WAP: Wormhole Attack Prevention Model in MANET Based on Hop-Count," International Journal of Advanced Research in Computer and Communication Engineering, vol. 4, Issue 7, Jul. 2015, 7 pp.

Meier et al., "NetHide: Secure and Practical Network Topology Obfuscation," USENIX, included in the Proceedings of the 27th USENIX Security Symposium, Aug. 15-17, 2018, can be found at: https://www.usenix.org/conference/usenixsecurity18/presentation/meier, 18 pp.

Looff, "Border Gateway Protocol Complexity and Stability," Faculty of Exact Sciences, department of Computer Science Vrije Universiteit Amsterdam, Masters Thesis, Dec. 17, 2013, 51 pp.

Soon et al., "IP Spoofing Defense: An Introduction," Department of Communication Technology and Network Universiti Putra Malaysia, Accessed Jan. 25, 2020, 5 pp.

Arumugam, "A Survey on Network-Based DoS and DDOS Attack and Defense Mechanisms," IJIRT, vol. 1 Issue 7, ISSN: 2349-6002, Dec. 2014, 9 pp.

Lee et al., "CoDef: Collaborative Defense Against Large-Scale Link-Flooding Attacks," CoNEXT '13: Proceedings of the ninth ACM conference on Emerging networking experiments and technologies, Dec. 2013, 11pp.

Lefevers, "Simulation of Adaptive Network Reconfiguration Under Overwhelming Denial of Service Attack (Outpace)," Thesis, North Carolina State University, Master of Engineering, Department of Computer Science, 2010.

Xue et al., "Towards Detecting Target Link Flooding Attack," USENIX, included in the Proceedings of the 28th Large Installation System Administration Conference (LISA14), Nov. 9-14, 2014, 17 pp.

Skowyra et al., "Effective Topology Tampering Attacks and ,Defenses in Software-Defined Networks," MIT Lincoln aboratory, IEEE, date of conference: Jun. 25-28, 2018, 12 pp.

Abdelouahab et al., "The Topology Change Attack: Threat and Impact," Journal of Universal Computer Science, vol. 14, No. 2, submitted Oct. 20, 2008, 23 pp.

Dhawan et al., "SPHINX: Detecting Security Attacks in Software-Defined Networks," 2015, 15 pp.

* cited by examiner

SECURE NETWORK TOPOLOGY

TECHNICAL FIELD

The disclosure relates to computer networks.

BACKGROUND

Many large-scale networks have been deployed using single link state protocol domains such as Interior Gateway Protocol (IGP) domains. Further, large scale networks may be designed with a relatively flat topology, that is, with little or no hierarchical structure. The use of a single IGP domain and/or flat network topologies can ease operational overhead associated with a designing and maintaining a network such as a wide area network (WAN). However, a single IGP domain or a relatively flat topology can have increased security risks. For example, an IGP domain can include nodes at remote physical locations. These remote nodes may be more vulnerable to physical access, thus making an attack easier. Further, an attacker with physical access to a node or access via a compromised node password can allow the attacker easy entry onto the node. With such access, an attacker may be able to access the whole network. The result of a malicious attack can thus affect the whole network, especially when a flat topology is used. Thus, a malicious attack can lead to catastrophic consequences for the network and devices served by the network. For example, an attacker with access to a node on the network may cause the compromised node to push a fake topology to other uncompromised nodes on the network. In other words, the compromised node may provide routing information that includes fake nodes and fake links between nodes that do not in fact exist. The fake topology can cause other nodes to misroute and drop network traffic, causing serious disruptions in service. Such an attack may be referred to as a denial of service (DOS) attack because network services may be denied to computing system that rely on the network for data communication.

Authentication mechanisms may be used to provide protection from attacks. For example, Open Shortest Path First (OSPF) and Intermediate System to Intermediate System (ISIS) nodes may use MD5 authentication to authenticate a neighbor node before forming adjacency. However, when a node in the IGP topology is physically compromised, it is possible that the md5 password is available for the intruder to use. In such cases, the attacker can manipulate the link state database (LSDB) of the network at will, potentially paralyzing the network.

Further, it is possible to develop and deploy mechanisms to secure the device with multiple authentication steps. However, such added security mechanisms are typically device specific. As a result, old devices on a network and/or their operating systems may not have the capability to upgrade to newer authentication mechanisms. Thus, the presence of older devices can leave the network susceptible to attack.

SUMMARY

In general, the disclosure describes techniques that provide for a secure IGP topology or other link state topology that can be implemented by a network security unit that runs in a centralized environment on servers separate from a network associated with the IGP topology. The network security unit acquires the topology information, such as by participating in IGP or through border gateway protocol with link state (BGP-LS). The network security unit detects possible network problems, such as indicators of potential network attacks. Once an indicator of a potential network attack is detected, the network security unit identifies the node that is compromised. Once the compromised node is identified, the network security unit can report the node for manual intervention. In some aspects, the network security unit can isolate the compromised node by shutting down links connected to the compromised node.

The techniques of the disclosure may provide one or more advantages. For example, as discussed above, a technical problem exists with current systems is that nodes in a network may not be capable of being upgraded to incorporate improvements in security features. Further, it can be difficult to detect that a remote node has been physically accessed and compromised by malware. The techniques described herein provide a technical solution to such problems by detecting indicators of a potential attack on a network, such as modifications to the network topology that may be made by a compromised node that advertises false nodes and false links. An advantage of the technical solution provided by the techniques described herein is that the network topology for large relatively flat networks can be secured without requiring an upgrade or change to existing routers in the network. These advantages may be realized by a practical application of the techniques described herein as part of a network security application or suite of applications.

In one example, a method includes determining, by a computing device having one or more processors, safe state data of a topology of a network having a plurality of nodes; detecting, by the computing device, indicators of a potential network attack; and in response to detecting the indicators of the potential network attack, comparing, by the computing device, the safe state data of the topology with current state data of the topology of the network, identifying, by the computing device and based on the comparison, a routing node of the plurality of routing nodes as a compromised node, and reporting, by the computing device, an indication of the compromised node.

In another example, a system includes a network having a plurality of routing nodes and a plurality of links between the routing nodes; and a network security unit executable by one or more processors, the network security unit configured to: determine safe state data of a topology of the network, detect indicators of a potential network attack, and in response to detection of the indicators of the potential network attack, compare the safe state data of the topology with current state data of the topology of the network, identify, based on the comparison, a routing node of the plurality of routing nodes as a compromised node, and report the compromised node.

In a further example, a computer-readable medium includes instructions for causing a programmable processor to: determine safe state data of a topology of a network having a plurality of routing nodes; detect an indicator of a potential network attack; and in response to detection of the indicator of the potential network attack, compare the safe state data of the topology with current state data of the topology of the network, identify, based on the comparison, a routing node of the plurality of routing nodes as a compromised node, and report the compromised node.

The details of one or more examples are set forth in the accompanying drawings and the description below. Other features, objects, and advantages will be apparent from the description and drawings, and from the claims.

DETAILED DESCRIPTION

Figure 1:
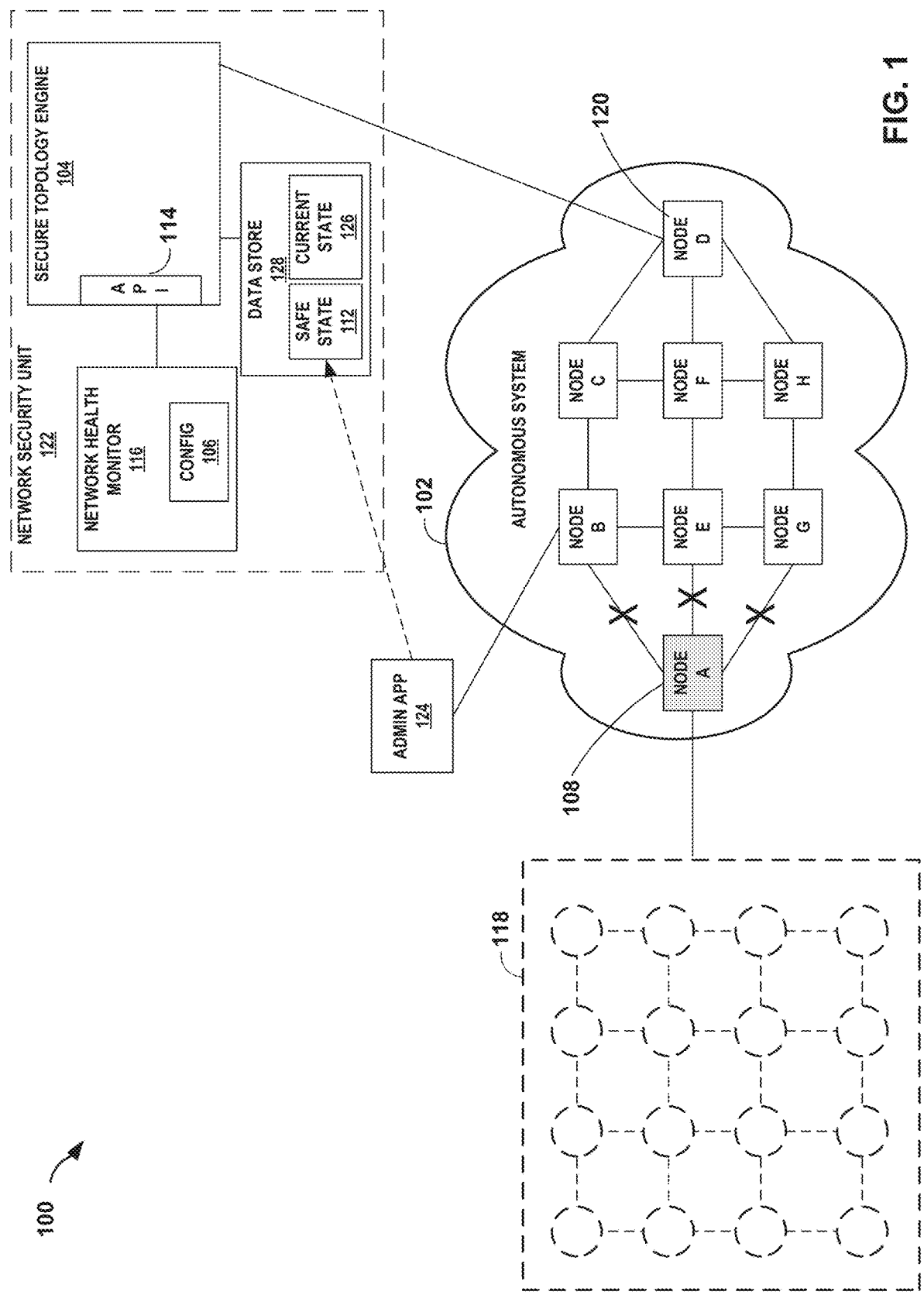
FIG. 1 is a block diagram illustrating a system for providing a secure network topology.

FIG. 1 is a block diagram illustrating a system 100 for providing more secure network topology state data. In some aspects, system 100 includes an autonomous system 102, network security unit 122, and administrator application 124. Autonomous system 102 can comprise a collection of nodes (e.g., nodes A-H) having links communicatively coupling the nodes to form a network topology. In some aspects, autonomous system 102 can comprise, or be a part of, a wide area network (WAN). In some aspects, the state data for the topology includes Internet Protocol routing prefixes under the control of one or more network operators. The autonomous system 102 may implement a routing policy to another autonomous system or to a network such as the Internet. In general, the physical nodes and links within an autonomous system remain stable. Maintenance procedures may be performed via an administrator application 124 in order to add nodes and links and to remove (i.e., decommission) nodes and links. Additionally, IP address changes may be performed via configuration changes that may be specified using administrator application 124. The autonomous system 102 may be subject to transient events in the network that may include link up/down state changes, metric changes, and prefix re-origination changes.

A network security unit 122 may be deployed on one or more servers communicatively coupled to the autonomous system 102. In some aspects, network security unit 122 may include a network health monitor 116 and a secure topology engine 104. In some aspects, secure topology engine 104 can be a routing protocol process (e.g., a containerized routing protocol daemon (cRPD)). Secure topology engine 104 can maintain safe state data 112 indicative of a known or assumed safe state of the topology of the network of autonomous system 102. The safe state data 112 of the topology generally represents the physical state of the network, e.g., the physical node and links in the topology and does not necessarily represent a current running state of the topology. In some aspects, secure topology engine 104 can maintain the safe state data 112 of the topology via administrator application 124. For example, the addition or removal of nodes from autonomous system 102 may be communicated to secure topology engine 104 by administrator application 124 as part of a workflow of commissioning or decommissioning a node in autonomous system 102. The addition or removal of a node can be automated. For example, a node may be automatically added to or removed from the safe state data 112 when a new node is added or removed by a network administrator. Alternatively, a node may be added to or removed from the safe state data 112 as a separate step of a workflow performed by the network administrator. Similarly, the addition or removal of links and/or prefixes for autonomous system 102 may be communicated to secure topology engine 104 by administrator application 124 as part of a workflow for adding or removing links and prefixes. Secure topology engine 104 can update the safe state data 112 of the network topology based on the information received from administrator application 124. In some aspects, the safe state data 112 may be initially created by taking a network "snapshot' of the current network topology. The administrator application can update the network snapshot by adding nodes and links that do not appear in the initial network snapshot (e.g., nodes that were not running at the time the snapshot was taken).

In some aspects, an update of the safe state data 112 of the topology may be triggered by an event, such as event based on information received using a routing protocol. For example, the secure topology engine take a snapshot of the current network topology in response to an event based on listening for Border Gateway Protocol with link state (BGP-LS) or IGP messages for autonomous system 102. An administrator may use administration application 124 to update the network topology if necessary and update the safe state data 112 based on the snapshot. Such updates may be integrated into network administration workflows.

Secure topology engine 104 may also use topology information received via the routing information protocol to update current state data 126 of the topology. In some examples, network security unit 122 may establish a BGP session or other routing protocol session with a node in autonomous system 102, such as node D 120. The current state data 126 of the topology may include data representing the current running state of the topology, i.e., the currently running nodes, operative links, and prefixes used in the network of autonomous system 102.

The safe state data 112 of the network topology and the current state data 126 may be maintained in a data store 128. Data store 128 may be a data storage device that can temporarily or persistently store the safe state data 112 and current state data 126. As one example, the safe state data 112 and/or the current state data 126 may be stored as YANG data models. A YANG data model is a data modelling language that can be used to model network configuration and network state data. Further details on the YANG data model may be found in Bjorklund, M., "YANG—A Data Modeling Language for the Network Configuration Protocol (NETCONF)", RFC 6020, October 2010, which is hereby incorporated by reference herein. As shown in FIG. 1, safe state data 112 and current state data 126 may be stored in the same data store 128, or they may be stored in separate data stores.

Network heath monitor 116 may maintain a configuration 106. Configuration 106 can include thresholds for maximum node changes, maximum link changes and prefix changes. Further, the configuration 106 can include thresholds for other network events such as shortest path first (SPF) triggers in a specific time period. In some aspects, the time period may not consider SPF hold or delay time. The threshold on SPF triggers may be configurable for both the number of SPFs as well as the time period. Network health monitor 116 may use data in configuration 106 along with rules, heuristics, algorithms etc. to determine if there are indicators of potential network problems or issues, including indicators that the network is under attack. Further, network health monitor may use machine learning or other artificial intelligence techniques to detect indicators that the network may be under attack.

In some aspects, secure topology engine 104 can expose an Application Program Interface (API) that can be used by network health monitor 116 to facilitate determining if an attack is present within autonomous system 102, and if so, determine a compromised node within autonomous system 102. The API can be used to identify nodes that deviate from the safe state data 112 of the network topology. For example, new nodes and new links appearing in the current state data 126 of the topology that are not present in the safe state data 112 of the topology can be flagged. The network health monitor 116 can send a notification to a network administrator indicating flagged nodes. In some aspects, with administrator approval, compromised nodes can be isolated from the rest of the nodes in the autonomous system 102. For example, administrator application 124 can output a recommendation that a node should be isolated. In response to receiving an indication of approval from the network administrator, the administration application can disable or remove the links to the node to be isolated.

In the example illustrated in FIG. 1, node A 108 is under attack and advertises a fake network topology 118 comprising one or more fake nodes and fake links that are incorrect (e.g., may not actually be present in autonomous system 102). As used herein, a node "advertises" a topology state by transmitting topology state information to another node or nodes. Network security unit 122 can identify node A 108 as a compromised node using the techniques described herein. In response to identifying node A 108 as a compromised node, network health monitor 116 can report the compromised node to a network administrator, who can isolate the compromised node A 108 by removing links from the compromised node A 108 to other nodes in the autonomous system 102. In the example illustrated in FIG. 1, links comprising tunnels from compromised node A 108 to nodes B, E and G may be removed from the topology in response to identifying node A 108 as a compromised node, thereby isolating node A 108 from the other nodes within the network of autonomous system 102.

Although one network security unit 122 is shown in the example illustrated in FIG. 1, multiple network security units may be deployed for redundancy. Additionally, in some aspects, network security unit 122 is established outside of autonomous system 102. For example, network security unit 122 may be hosted on a server in a data center and communicatively coupled to autonomous system 102 via a border router 120 of autonomous system 102.

Further details on the operation of network security unit 122 are presented below with respect to FIGS. 2 and 3.

Figure 2:
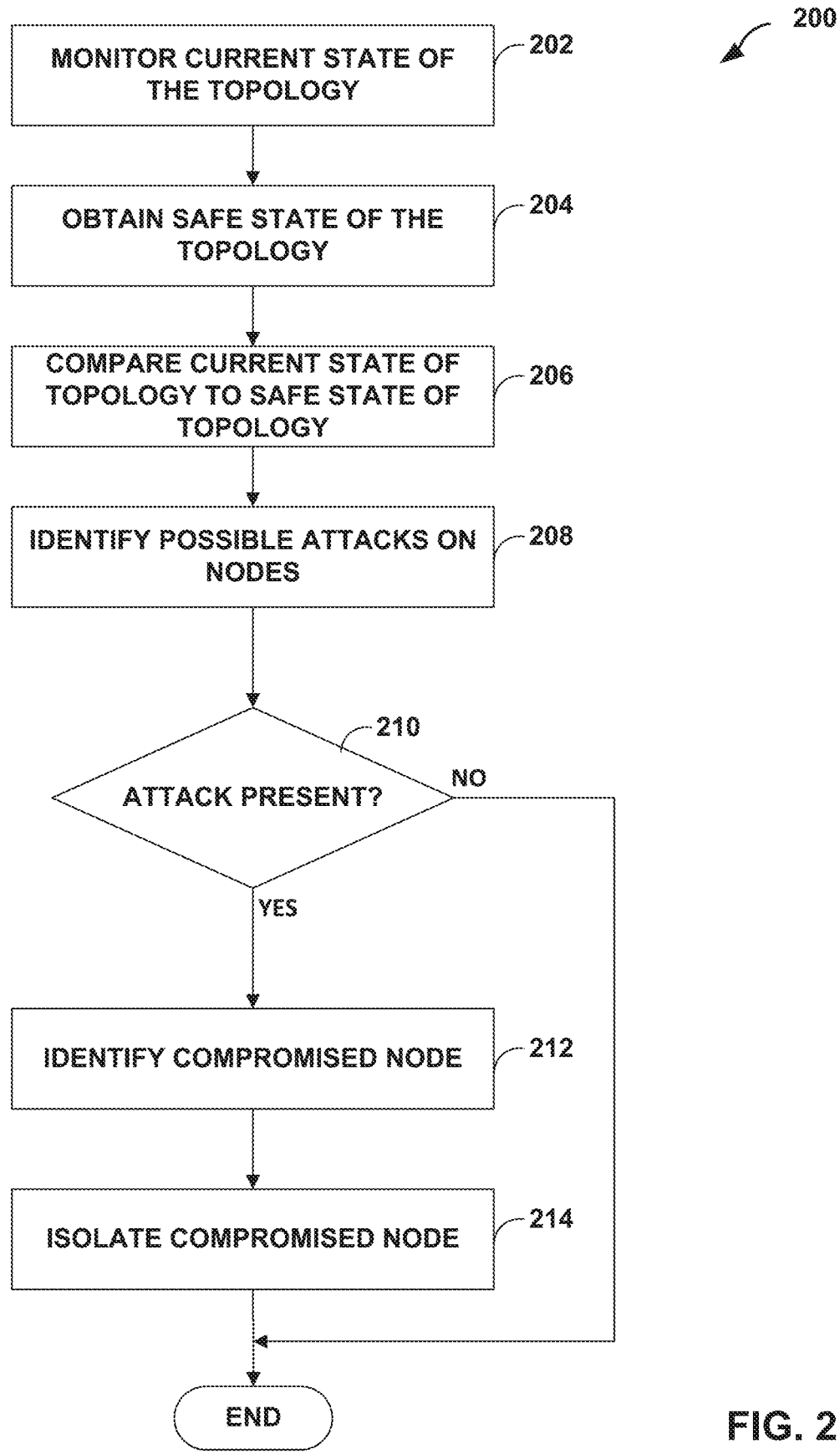
FIG. 2 is a flowchart illustrating example operations for providing a secure network topology.

FIG. 2 is a flowchart 200 illustrating example operations for providing a secure network topology. The operations illustrated in the example shown in FIG. 2 may be performed periodically to determine if a node in the topology has been compromised. In some aspects, a network security unit 122 can monitor an autonomous system 102 to maintain a current state of the network topology (202). The current state of the topology may be obtained from the network by participating in an IGP, BGP-LS protocol or other link-state protocol.

Periodically, or in response to a network event, the network security unit 122 can obtain the safe state of the network topology (204). For example, a network health monitor 116 can obtain the safe state of the network topology from a secure topology engine at periodic intervals (e.g., every hour, every three hours etc.) or in response to detecting a network event such as a change in the number of nodes or links in the network, SPF recalculation triggers etc.

As noted above, the safe state data of the topology can be information representing the physical nodes, physical links, and prefixes configured for the network, irrespective of whether or not the node is running or whether the link is operative. For example, whenever the physical state of the network changes (e.g., a new node is commissioned or an existing node is decommissioned, a link is added/deleted etc.), the safe state of the network topology maintained by the network security unit 122 can be updated to according to the physical change of the topology. Thus, the safe state of the topology generally represents the physical state of the network, e.g., the physical node and physical links in the network topology. This can be contrasted with the current state of the topology which can represent a running state of the network. For example, only running nodes and operative links may be represented in the current state of the topology. However, changes in link or routing status may not result in a change to the safe state of the topology. For example, logical changes to the network topology such as a change in the routing to avoid a node in favor of a different node would not necessarily change the safe state of the topology as long as a physical link to the avoided node was still present.

The network security unit 122 can compare the current state of the network topology with the safe state of the topology to identify differences between the current state of the network topology and the safe state of the network topology (206). Based on the comparison, the network security unit 122 can identify possible attacks on one or more nodes in the network topology (208).

Figure 3:
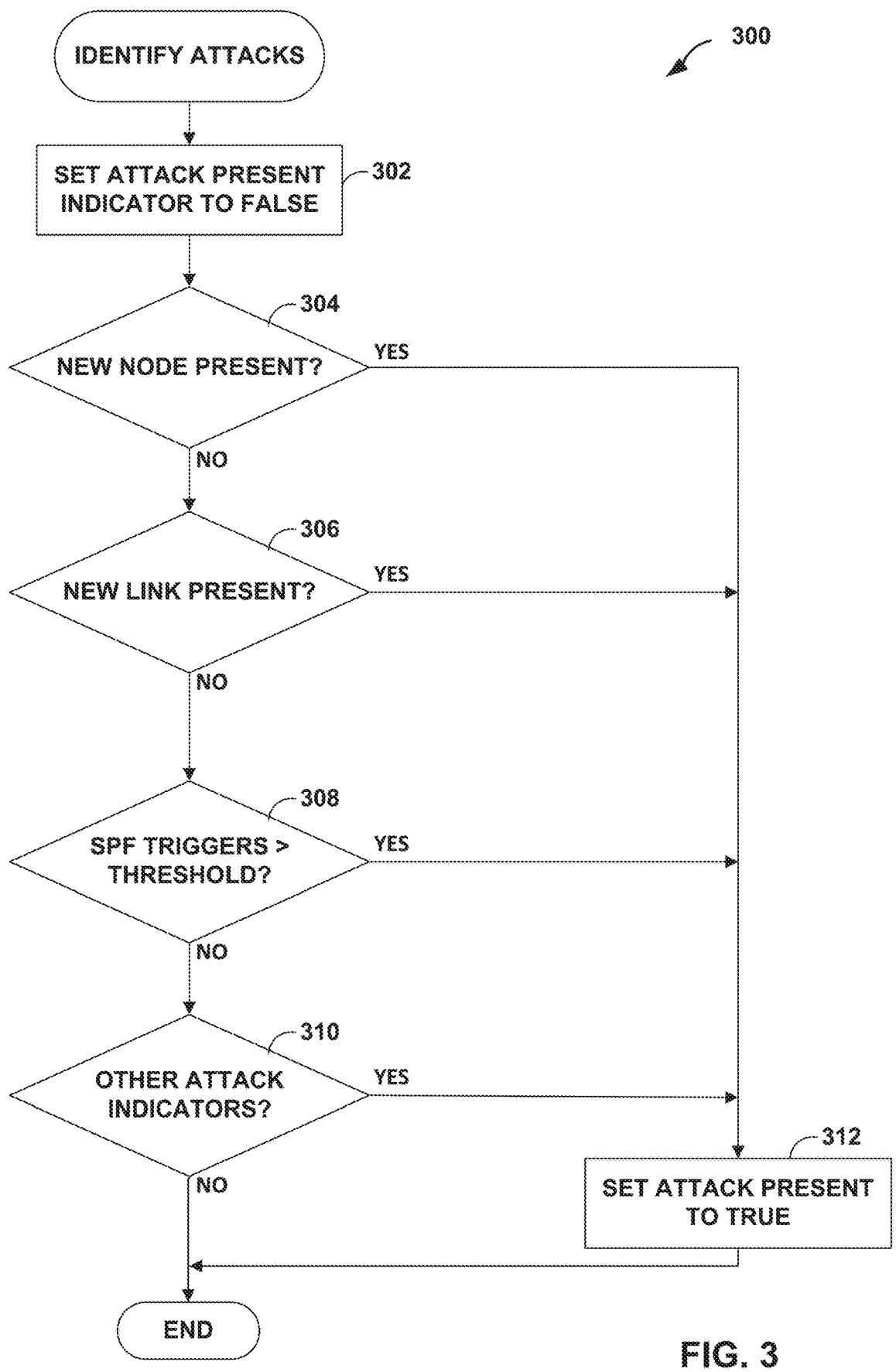
FIG. 3 is a flowchart illustrating example operations for identifying an attack in a network topology.

FIG. 3 is a flowchart 300 illustrating example operations of a method for detecting indicators of a potential network attack. In some aspects, the method begins by initializing an attack present indicator to false. Thus, the default case is that a potential network attack is not indicated.

The network security unit may check to determine if a new node is present (304). In some aspects, the network security unit 122 may check to determine if an increase in the number of nodes is over a predetermined or configurable threshold. If a new node is present, or if the number of new nodes exceeds the threshold ("YES" branch of 304), the attack present indicator can be set to true (312). If a new node is not present, or if the number of new nodes does not exceed the threshold, the method proceeds to check for other attack indicators ("NO" branch of 304).

The network security unit may check to determine if a new link is present (306). In some aspects, the network security unit 122 may check to determine if an increase in the number of links is over a predetermined or configurable threshold. If a new link is present, or if the number of new links exceeds the threshold ("YES" branch of 306), the attack present indicator can be set to true (312). If a new link is not present, or if the number of new links does not exceed the threshold, the method proceeds to check for other attack indicators ("NO" branch of 306).

The network security unit may check to determine if the number of SPF triggers exceeds a predetermined or configurable threshold (308). SPF triggers indicate a change in the topology and can cause a recalculation of SPF values. If the number of SPF triggers exceeds the threshold ("YES" branch of 308), the attack present indicator can be set to true (312). If the number of SPF triggers does not exceed the threshold, the method proceeds to check for other attack indicators ("NO" branch of 308).

The network security unit may check for other indicators of a potential network attack in addition to those discussed above (310). Examples of such indicators include:

An increase in the number of prefixes in IGP beyond a defined maximum threshold.

Number of nodes variations (variations due to repeated node reboots)

Repeated hello message rejections (e.g., ISIS hello rejections)

Presence of skewed network metrics (e.g., metrics that are not within a range or tolerance of expected values).

Link State Advertisement (LSA) fluctuations

Adjacency flaps (e.g., alternately advertising a destination network via one route then another different route)

Excessive purges (e.g., purges due to erroneous link state packets)

If one of more of these other indicators of a potential network attack are present ("YES" branch of 310), the attack present indicator can be set to true (312). If none of these other indicators of a potential network attack are present, the method ends ("NO" branch of 310).

In some aspects, the number of nodes, links or prefixes may be associated with static thresholds, while SPF triggers may use dynamic threshold algorithms.

Returning to FIG. 2, the network security unit 122 can determine, if an indicator of a potential network attack has been detected (210). If a potential network attack is not detected at operation 204, then the method ends ("NO" branch of 210). If a potential network attack is detected ("YES" branch of 210), the network security unit can proceed to identify the compromised node (212).

The network security unit 122 can use various means to identify a compromised node. In some aspects, the network security unit can compare the current topology with the safe topology. In some aspects, the current state of the network topology is compared with safe state of the network topology, every node by node matching every link and prefix from the current topology to the safe topology. Missing links/prefixes may be acceptable, but if new nodes or links appear in the current state data for the network topology, then those nodes that advertise the incorrect information (e.g., information that deviates from the safe state data of the network topology) are marked as compromised nodes.

Additionally, the network security unit 122 can perform prefix matching. Prefixes may be more dynamic in nature. In some aspects, if a node advertises/re-originates more prefixes than maximum limits configured on that router, it is marked as compromised node. Further, prefixes can be matched against the safe topology. If there are nodes that advertise conspicuous prefixes which the nodes are not expected to, advertise such nodes are marked as compromised.

The network security unit can isolate compromised nodes (214). In some aspects, isolation of the compromised node may be done based on human intervention. For example, a report of compromised nodes can be sent to a network administrator and upon confirmation by the network administrator, the neighbors of compromised nodes will have the interfaces to the compromised node shut down, thus isolating the compromised node from the network. In some aspects, isolation of the compromised node may be done automatically, without human intervention.

Figure 4:
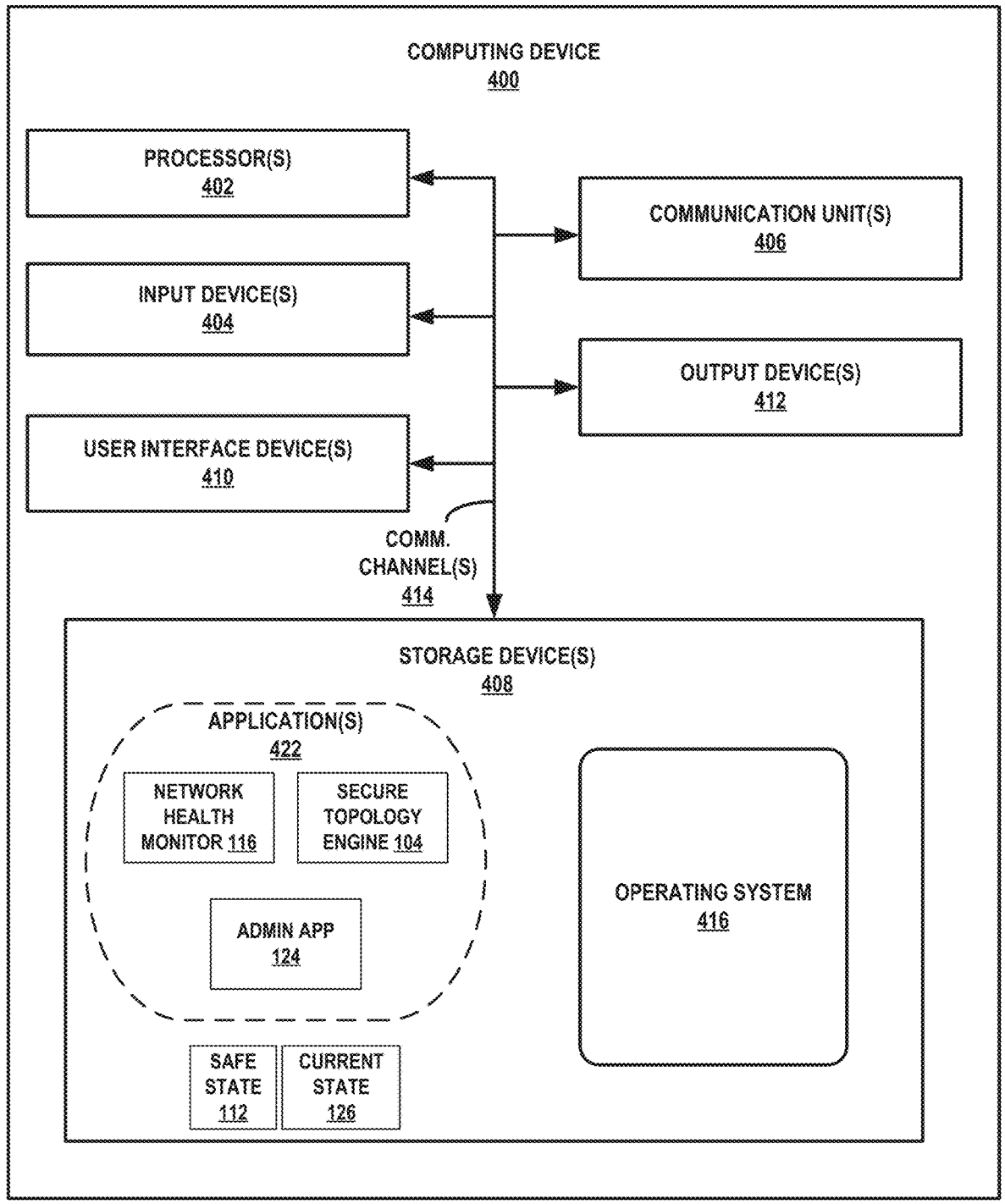
FIG. 4 is a block diagram illustrating further details of one example of a computing device that operates in accordance with one or more techniques of the present disclosure.

FIG. 4 is a block diagram illustrating further details of one example of a computing device that operates in accordance with one or more techniques of the present disclosure. FIG. 4 may illustrate a particular example of a server or other computing device 400 that includes one or more processor(s) 402 for executing any one or more of secure topology engine 104, network health monitor 116, or any other system, application, node software, or module described herein. Other examples of computing device 400 may be used in other instances. Although shown in FIG. 4 as a stand-alone computing device 400 for purposes of example, a computing device may be any component or system that includes one or more processors or other suitable computing environment for executing software instructions and, for example, need not necessarily include one or more elements shown in FIG. 4 (e.g., communication units 406; and in some examples components such as storage device(s) 408 may not be co-located or in the same chassis as other components).

As shown in the specific example of FIG. 4, computing device 400 includes one or more processors 402, one or more input devices 404, one or more communication units 406, one or more output devices 412, one or more storage devices 408, and user interface (UI) device 410. Computing device 400, in one example, further includes one or more applications 422 and operating system 416 that are executable by computing device 400. Each of components 402, 404, 406, 408, 410, and 412 are coupled (physically, communicatively, and/or operatively) for inter-component communications. In some examples, communication channels 414 may include a system bus, a network connection, an inter-process communication data structure, or any other method for communicating data. As one example, components 402, 404, 406, 408, 410, and 412 may be coupled by one or more communication channels 414.

Processors 402, in one example, are configured to implement functionality and/or process instructions for execution within computing device 400. For example, processors 402 may be capable of processing instructions stored in storage device 408. Examples of processors 402 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 408 may be configured to store information within computing device 400 during operation. Storage device 408, in some examples, is described as a computer-readable storage medium. In some examples, storage device 408 is a temporary memory, meaning that a primary purpose of storage device 408 is not long-term storage. Storage device 408, in some examples, is described as a volatile memory, meaning that storage device 408 does not maintain stored contents when the computer is turned off. Examples of volatile memories include random access memories (RAM), dynamic random access memories (DRAM), static random access memories (SRAM), and other forms of volatile memories known in the art. In some examples, storage device 408 is used to store program instructions for execution by processors 402. Storage device 408, in one example, is used by software or applications running on computing device 400 to temporarily store information during program execution.

Storage devices 408, in some examples, also include one or more computer-readable storage media. Storage devices 408 may be configured to store larger amounts of information than volatile memory. Storage devices 408 may further be configured for long-term storage of information. In some examples, storage devices 408 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 400, in some examples, also includes one or more communication units 406. Computing device 400, in one example, utilizes communication units 406 to communicate with external devices via one or more networks, such as one or more wired/wireless/mobile networks. Communication units 406 may include a network interface card, such as an Ethernet card, an optical transceiver, a radio frequency transceiver, or any other type of device that can send and receive information. In some examples, computing device 400 uses communication unit 406 to communicate with an external device.

Computing device 400, in one example, also includes one or more user interface devices 410. User interface devices 410, in some examples, are configured to receive input from a user through tactile, audio, or video feedback. Examples of user interface devices(s) 410 include a presence-sensitive display, a mouse, a keyboard, a voice responsive system, video camera, microphone or any other type of device for detecting a command from a user. In some examples, a presence-sensitive display includes a touch-sensitive screen.

One or more output devices 412 may also be included in computing device 400. Output device 412, in some examples, is configured to provide output to a user using tactile, audio, or video stimuli. Output device 412, in one example, includes a presence-sensitive display, a sound card, a video graphics adapter card, or any other type of device for converting a signal into an appropriate form understandable to humans or machines. Additional examples of output device 412 include a speaker, a cathode ray tube (CRT) monitor, a liquid crystal display (LCD), or any other type of device that can generate intelligible output to a user.

Computing device 400 may include operating system 416. Operating system 416, in some examples, controls the operation of components of computing device 400. For example, operating system 416, in one example, facilitates the communication of one or more applications 422 with processors 402, communication unit 406, storage device 408, input device 404, user interface devices 410, and output device 412.

Application 422 may also include program instructions and/or data that are executable by computing device 400. Example applications 422 executable by computing device 400 may include application and/or other software to implement capabilities described above. For example, applications 422 can include the secure topology engine 104 that maintains safe state data 112 for a network. Applications 422 can further include network health monitor 116, that as described above, may monitor a network for indicators of a potential network attack. Additionally, applications 422 can include administrative application 124 that may orchestrate workflows for commissioning and decommissioning routing nodes, adding and removing links, defining configuration parameters etc.

Storage device(s) 408 may also be used to persistently store safe state data 112 for a network topology and/or current state data 126 for the network topology.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:

1. A method comprising:
   determining, by a computing device comprising one or more processors, safe state data indicative of a physical state of a topology of a computer network comprising a plurality of routing nodes;
   detecting, by the computing device, an indicator of a potential network attack; and
   in response to detecting the indicator of the potential network attack:
      comparing, by the computing device, the safe state data indicative of the physical state of the topology of the computer network with current state data indicative of a running state of the topology of the computer network;
      identifying, by the computing device and based on the comparison, a routing node of the plurality of routing nodes as a compromised node; and
      reporting, by the computing device, an indication of the compromised node.

2. The method of claim 1, wherein determining the safe state data indicative of the physical state of the topology of the computer network comprises determining a physical topology comprising the plurality of routing nodes and links between the plurality of routing nodes irrespective of a current running status of the plurality of routing nodes and the links between the plurality of routing nodes.

3. The method of claim 1, wherein detecting the indicator of the potential network attack comprises detecting that a new routing node has been added to the topology.

4. The method of claim 3, wherein identifying the routing node of the plurality of routing nodes as the compromised node comprises determining that the compromised node advertised the new routing node.

5. The method of claim 1, wherein detecting the indicator of the potential network attack comprises detecting that a new link has been added to the topology.

6. The method of claim 5, wherein identifying the routing node of the plurality of routing nodes as the compromised node comprises determining that the compromised node advertised the new link.

7. The method of claim 1, wherein detecting the indicator of the potential network attack comprises detecting that a number of prefixes added to the topology exceeds a predetermined threshold or a configurable threshold.

8. The method of claim 1, further comprising updating the safe state data indicative of the physical state of the topology in response to one of a routing node commissioning or a routing node decommissioning, and wherein the safe state data indicative of the physical state of the topology is not updated in response to a routing node status change or a link status change.

9. The method of claim 1, further comprising outputting, by the computing device, a recommendation to isolate the compromised node.

10. A system comprising:
   a computer network comprising a plurality of routing nodes and a plurality of links between the routing nodes; and
   a network security unit executed by hardware-based processing circuitry, the network security unit configured to:
      determine safe state data indicative of a physical state of a topology of the computer network,
      detect an indicator of a potential network attack, and
      in response to detection of the indicator of the potential network attack:
         compare the safe state data indicative of the physical state of the topology of the computer network with current state data indicative of a running state of the topology of the computer network;
         identify, based on the comparison, a routing node of the plurality of routing nodes as a compromised node; and
         report an indication of the compromised node.

11. The system of claim 10, wherein to determine the safe state data indicative of the physical state of the topology of the computer network, the network security unit is configured to determine a physical topology comprising the plurality of routing nodes and the plurality of links irrespective of a current running status of the plurality of routing nodes and the plurality of links.

12. The system of claim 10, wherein the detection of the indicator of the potential network attack comprises a detection that a new routing node has been added to the topology and wherein identification of the routing node of the plurality of routing nodes as the compromised node comprises a determination that the compromised node advertised the new routing node.

13. The system of claim 10, wherein the detection of the indicator of the potential network attack comprises a detection that a new link has been added to the topology and wherein identification of the routing node of the plurality of routing nodes as the compromised node comprises a determination that the compromised node advertised the new link.

14. The system of claim 10, wherein the detection of the indicator of the potential network attack comprises a detection that a number of prefixes added to the topology exceeds a predetermined threshold or a configurable threshold.

15. The system of claim 10, wherein the network security unit is physically separate from the computer network.

16. The system of claim 10, wherein the network security unit comprises a network health monitor and a routing protocol process, and wherein the routing protocol process is configured to determine the safe state data indicative of the physical state of the topology of the computer network and wherein the network health monitor receives the safe state data indicative of the physical state of the topology of the computer network and detects the indicator of the potential network attack.

17. The system of claim 16, wherein the routing protocol process is configured to:
   receive topology updates from a routing node in the computer network; and
   update the safe state data indicative of the physical state of the topology of the computer network in response to one of a routing node commissioning or a routing node decommissioning, and wherein the safe state data indicative of the physical state of the topology is not updated in response to a routing node status change or a link status change.

18. A non-transitory computer-readable medium comprising instructions configured to cause a programmable processor to:
   determine safe state data indicative of a physical state of a topology of a computer network comprising a plurality of routing nodes;
   detect an indicator of a potential network attack; and
   in response to detection of the indicator of the potential network attack;
      compare the safe state data indicative of the physical state of the topology of the computer network with current state data indicative of a running state of the topology of the computer network;
      identify, based on the comparison, a routing node of the plurality of routing nodes as a compromised node; and
      report the compromised node.

19. The non-transitory computer-readable medium of claim 18, wherein the instructions configured to cause the programmable processor to determine the safe state data indicative of the physical state of the topology of the computer network comprise instructions configured to cause the programmable processor to determine a physical topology comprising the plurality of routing nodes and links between the plurality of routing nodes irrespective of a current running status of the plurality of routing nodes and the links between the plurality of routing nodes.

20. The non-transitory computer-readable medium of claim 18,
   wherein the instructions configured to cause the programmable processor to detect the indicator of the potential network attack comprise instructions configured to cause the programmable processor to detect that a new routing node or a new link has been added to the topology and
   wherein the instructions configured to cause the programmable processor to identify the routing node of the plurality of routing nodes as the compromised node comprise instructions configured to cause the programmable processor to determine that the compromised node advertised the new routing node or the new link.

* * * * *